United States Patent
Wang (10) Patent No.: US 9,800,146 B2
(45) Date of Patent: Oct. 24, 2017

(54) NON-SYNCHRONOUS BUCK CONVERTER WITH SOFTWARE-BASED BOOTSTRAP

(71) Applicant: Halliburton Energy Services, Inc., Houston, TX (US)

(72) Inventor: Lei Wang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/116,019

(22) PCT Filed: Jul. 30, 2015

(86) PCT No.: PCT/US2015/042930
§ 371 (c)(1),
(2) Date: Aug. 2, 2016

(87) PCT Pub. No.: WO2017/019093
PCT Pub. Date: Feb. 2, 2017

(65) Prior Publication Data
US 2017/0187281 A1    Jun. 29, 2017

(51) Int. Cl.
*H02M 3/158* (2006.01)
*H02M 3/156* (2006.01)
*E21B 41/00* (2006.01)

(52) U.S. Cl.
CPC ............ *H02M 3/156* (2013.01); *E21B 41/00* (2013.01); *H02M 3/158* (2013.01)

(58) Field of Classification Search
None
See application file for complete search history.

(56) References Cited

U.S. PATENT DOCUMENTS

| 8,193,798 | B1* | 6/2012 | Pace ................... H02M 3/156 323/284 |
| 9,328,597 | B2* | 5/2016 | Morys .................. E21B 43/25 |
| 2004/0036458 | A1 | 2/2004 | Johnson et al. |
| 2010/0171475 | A1 | 7/2010 | Leman et al. |
| 2010/0200244 | A1* | 8/2010 | Purkis .................. E21B 34/066 166/373 |

(Continued)

FOREIGN PATENT DOCUMENTS

| EP | 2445080 A1 | 4/2012 |
| JP | 2002-186249 A | 6/2002 |
| KR | 10-2009-0071713 A | 7/2009 |

OTHER PUBLICATIONS

International Search Report and Written Opinion issued in related PCT Application No. PCT/US2015/042930 dated Apr. 25, 2016, 10 pages.

*Primary Examiner* — Jeffrey Gblende
(74) *Attorney, Agent, or Firm* — John W. Wustenberg; Baker Botts L.L.P.

(57) ABSTRACT

An example power converter system may include a non-synchronous buck converter and a controller coupled to the a non-synchronous buck converter to receive a voltage level provided by a power source to the non-synchronous buck converter. The controller may also determine a minimum set point value for the non-synchronous buck converter based, at least in part, on the received voltage level. The controller may also alter a set point of the non-synchronous buck converter if the determined minimum set point value is less than a target set point value of the non-synchronous buck converter.

17 Claims, 4 Drawing Sheets (56) References Cited

U.S. PATENT DOCUMENTS

| | | | | |
|---|---|---|---|---|
| 2014/0015503 A1* | 1/2014 | Cheng | ............... | H02M 3/1588 323/282 |
| 2015/0096744 A1* | 4/2015 | Signorelli | ........... | E21B 41/0085 166/244.1 |
| 2015/0377016 A1* | 12/2015 | Ahmad | .................. | E21B 47/16 340/855.8 |

\* cited by examiner

NON-SYNCHRONOUS BUCK CONVERTER WITH SOFTWARE-BASED BOOTSTRAP

CROSS-REFERENCE TO RELATED APPLICATION

The present application is a U.S. National Stage Application of International Application No. PCT/US2015/042930 filed Jul. 30, 2015, which is incorporated herein by reference in its entirety for all purposes.

BACKGROUND

The present disclosure relates generally to well drilling, evaluation, completion and/or production operations and, more particularly, to a non-synchronous buck converter with software-based bootstrap.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation. Some or all of these steps may require power delivery to electronic components located at the surface and downhole. Certain electronic components may require input voltages that are orders of magnitude lower than the voltage level of the available power source. In those instances, a buck converter may be used to reduce the voltage level of the power source to the voltage level required by the electronic component. Maintaining proper functionality of the buck converter can be difficult, however, particularly in harsh downhole conditions. Proper buck converter functionality may be equally important outside of the context of well drilling, evaluation, completion and/or production operations, as buck converters are commonly used in many different capacities and locations.

BRIEF DESCRIPTION OF THE DRAWING(S)

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION OF THE DISCLOSURE

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would, nevertheless, be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like. "Measurement-while-drilling" ("MWD") is the term generally used for measuring conditions downhole concerning the movement and location of the drilling assembly while the drilling continues. "Logging-while-drilling" ("LWD") is the term generally used for similar techniques that concentrate more on formation parameter measurement. Devices and methods in accordance with certain embodiments may be used in one or more of wireline (including wireline, slickline, and coiled tubing), downhole robot, MWD, and LWD operations.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "fluidically coupled" as used herein is intended to mean that there is either a direct or an indirect fluid flow path between two components.

Figures 1, 2:
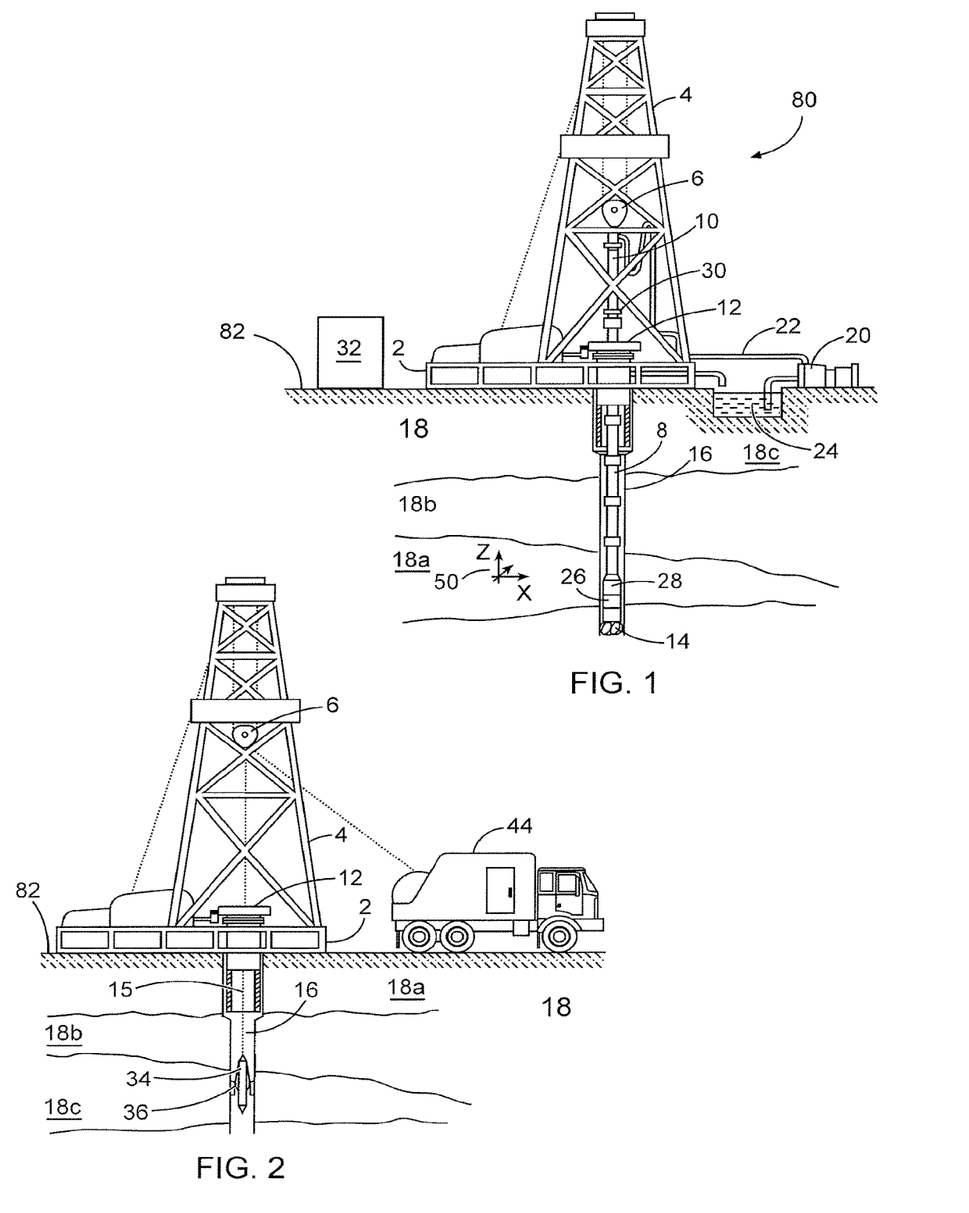
FIG. 1 is a diagram of an example subterranean drilling system, according to aspects of the present disclosure.
FIG. 2 is a diagram of an example subterranean drilling system with the drill string removed, according to aspects of the present disclosure.

FIG. 1 is a diagram of a subterranean drilling system 80, according to aspects of the present disclosure. The drilling system 80 comprises a drilling platform 2 positioned at the surface 82. In the embodiment shown, the surface 82 comprises the top of a formation 18 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD/MWD elements 26. As the bit extends the borehole 16 through the formations 18, the LWD/MWD elements 26 may collect measurements relating to borehole 16. The LWD/MWD elements 26 may be communicably coupled to a telemetry element 28. The telemetry element 28 may transfer measurements from LWD/MWD elements 26 to a surface receiver 30 and/or to receive commands from the surface receiver 30 via a surface information handling system 32. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the LWD/MWD elements 26 may also be stored within the LWD/MWD elements 26 or the telemetry element 28 for later retrieval at the surface 82 by the information handling system 32.

The BHA may also include a power source 50 that is coupled and provides power to electronic components within the BHA, including electronic components within the LWD/MWD elements 26. Example electronic components include sensors, control units, motors, solenoids, etc. Example power sources include battery packs, capacitor banks, and fluid drive turbines coupled to electrical generators that rotate in response to a flow of drilling fluid through the drill string 8. Although one power source is shown, multiple downhole power sources may be used. Other power sources may power electronic components located at the surface, including electronic components within the pump 20 and rotary table 12.

At various times during the drilling process, the drill string 8 may be removed from the borehole 16 as shown in FIG. 2. Once the drill string 8 has been removed, measurement/logging operations can be conducted using a wireline tool 34, i.e., an instrument that is suspended into the borehole 16 by a cable 15 having conductors for transporting power to the tool from a surface power source, and telemetry from the tool body to the surface 102. The wireline tool 34 may comprise electronic components similar to the electronic components described above. For instance, the wireline tool 34 may comprise logging and measurement elements 36, similar to the LWD/MWD elements 26 described above, which may comprise one or more electronic components in the form of sensors and controllers. The elements 36 may be communicatively coupled to the cable 15. A logging facility 44 (shown in FIG. 2 as a truck, although it may be any other structure) may collect measurements from the tool 36, and may include computing facilities (including, e.g., a control unit/information handling system) for controlling, processing, storing, and/or visualizing the measurements gathered by the elements 36. The computing facilities may be communicatively coupled to the elements 36 by way of the cable 15. In certain embodiments, the control unit 32 may serve as the computing facilities of the logging facility 44.

Figure 3:
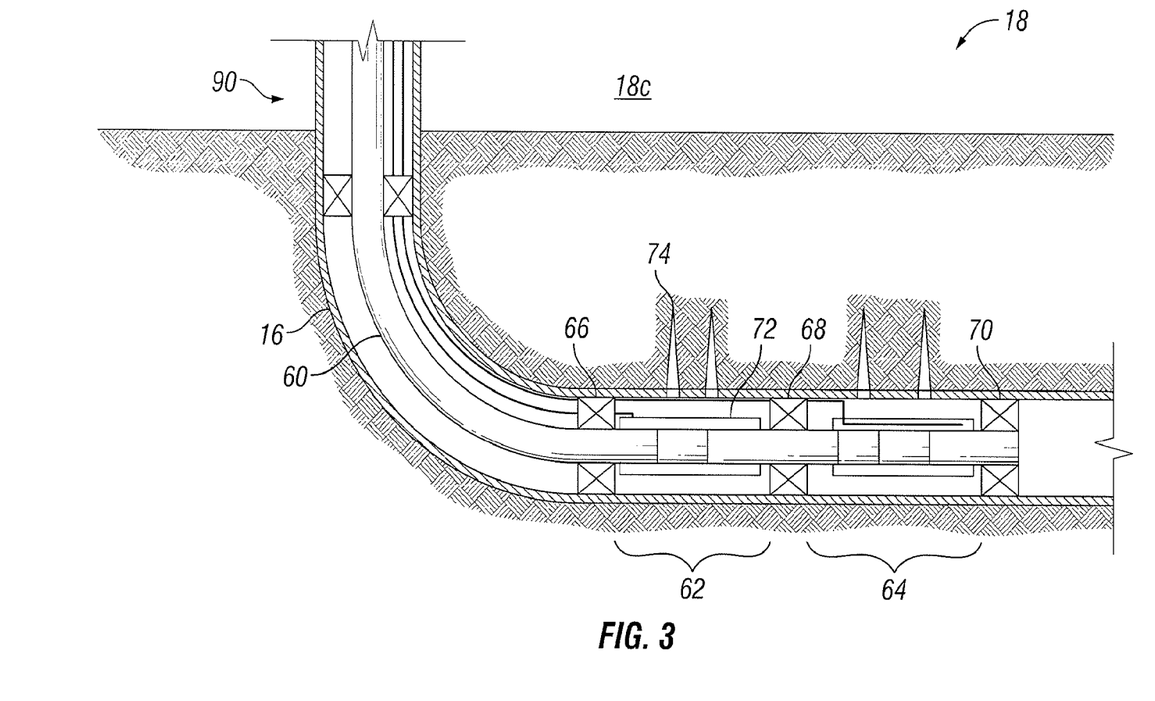
FIG. 3 is a diagram of an example completion assembly, according to aspects of the present disclosure.

Once the borehole 16 reaches a desired depth, completion operations may be undertaken to prepare the borehole 16 and wellbore to produce hydrocarbons. Completion operations may include, but are not limited to, hydraulic fracturing, perforation, and formation isolation. FIG. 3 is a diagram illustrating an example completion assembly 90 within the borehole 16, according to aspects of the present disclosure. As depicted, the assembly 90 includes a production tubular 60 coupled between the surface (not shown) of the formation 18, and completion stages 62 and 64. The completion stages 62 and 64 may but are not required to comprise portions of the borehole 16 and formation 18 isolated by packers 66-70. As depicted, each completion stage 62 and 64 isolates a fractured portion of the formation 18. Stage 62, for instance, comprises at least one remotely actuatable valve 72 that selectively isolates the fractured portion 74 of the formation 18 from the production tubular 60. As depicted, one or more control lines may extend from the valve 72 to the surface to provide control of the valve 72. The valve 72 may comprise an electrical component. The completion stages 62 and 64 as well as other completion tools may comprise electrical components similar to the ones described above. When opened, the valve 72 may provide fluid communication between the fracture 74 and the production tubular, such that hydrocarbons may be produced to the surface.

Figure 4:
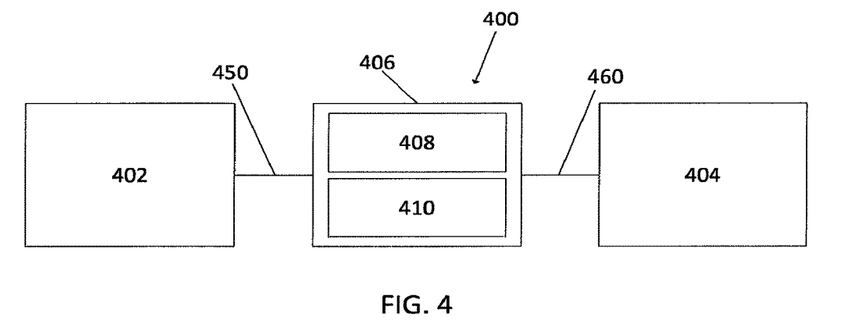
FIG. 4 is a diagram of an example power delivery system, according to aspects of the present disclosure.

The electronic components described above with reference to FIGS. 1, 2, and 3 may function at different operating voltages. In many cases, these operating voltages may be many factors of magnitude below the voltage level provided by the power source. To prevent damage to the electronic components, the voltage from the power source may be reduced to within the operating limits of the corresponding electronic component. FIG. 4 is a functional diagram of an example power delivery system 400 with voltage reduction capability, according to aspects of the present disclosure. The power delivery system 400 may be incorporated into a downhole environment. For instance, the system 400 may be at least partially incorporated into a power source within a BHA, similar to the power source depicted in FIG. 1; at least partially incorporated into a wireline tool, similar to the wireline tool depicted in FIG. 2, to provide necessary power to the electrical components within the tool; at least partially incorporated into a completion system, such as within the remotely actuatable valve described with reference to FIG. 3; or at least partially incorporated into a power delivery system at the surface. In certain embodiments, multiple power delivery systems may be used, depending on the number of electronic components and their operating limits.

In the embodiment shown, the power delivery system 400 comprises a power source 402 coupled to an electronic component 404 through a power converter 406. The power source 402 may generate or supply a voltage 450 with a first magnitude. The power converter 406 may receive the voltage 450 and output a voltage 460 with a second magnitude to the electronic component 404. The second magnitude may be less than the first magnitude and may be based, at least in part, on an operating voltage of the component 404. As described above, the electronic component 404 may include, but is not limited to, processors, sensors, solenoids, motors, and other surface and downhole electronic components that would be appreciated by one of ordinary skill in the art in view of this disclosure.

In the embodiment shown, the power converter 406 comprises a buck converter circuit 408 coupled to a controller 410. As used herein, a controller may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

As will be described in detail below, circuitry within the buck converter 408 may be responsible for reducing the voltage 450 from the first magnitude to the second magnitude voltage 460. The controller 410 may be responsible for controlling the circuitry and ensuring that it functions correctly across a range of voltage levels from the power source 402. This may be important in a downhole environment where the power source 402 may be subject to fluctuations or ramp up/ramp down times that can potentially cause damage to the circuitry within the buck converter 408. For instance, when the power source is a fluid driven turbine/electric generator in a downhole application, fluctuations within the drilling fluid flow rate result in fluctuations in the voltage level provided by the electric generator that can cause a damaging "latch up" condition at a drive circuit within the buck converter 408.

Figure 5:
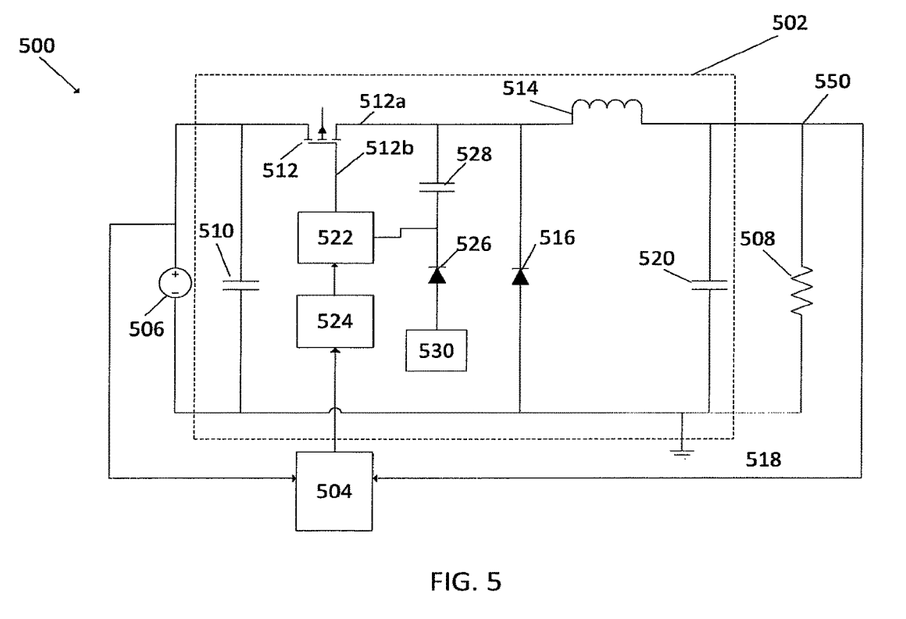
FIG. 5 is a diagram of an example power converter, according to aspects of the present disclosure.

FIG. 5 is a block diagram of an example power converter 500, according to aspects of the present disclosure. In the embodiment shown, the power converter 500 comprises a non-synchronous buck converter circuitry 502 and a controller 504. The circuitry 502 is coupled to a power source 506, which may comprise a power source similar to the ones described above. The circuitry 502 also may be coupled to a load, shown as resistor 508, which corresponds to an electronic component to which power converted from the power source 506 is provided. The controller 504 may be coupled to the power source 506, the load 508, and the converter circuitry 502.

As depicted, the circuitry 502 comprises an input capacitor 510 connected in parallel with the power source 506. Coupled to the input capacitor 510 and the positive terminal of the power source 506 is a switch 512. In the embodiment shown, the switch 512 comprises power metal oxide semiconductor field-effect transistors (MOSFET). Other types of power semiconductor device, semiconductor switches and transistors may also be used. The MOSFET 512 may selectively electrically couple the power source 506 to other elements of the converter 502, including inductor 514 and free-wheeling diode 516. The free-wheeling diode 516 may be connected directly to the MOSFET 512 and a ground potential 518. The inductor 514, in contrast, may be connected directly to the switch 512 but indirectly to the ground potential 518 through an output capacitor 520 connected in parallel with the load 508.

The controller 504 may be coupled to the MOSFET 512 through a driver circuit 522 and a pulse width modulation (PWM) circuit 524. In the embodiment shown, the controller 504 may be indirectly coupled to the gate of the MOSFET 512, and may issue control signals that cause the MOSFET 512 to periodically electrically connect the power source 506 and the inductor 514. Specifically, the controller 504 may transmit a signal comprising a series of voltage pulses to the pulse width modulation circuit 524, which may in response transmit an open/close waveform to the driver circuit 522. The open/close waveform may consist of a high voltage level for a first time period and a low voltage level for a second time period. The high voltage level may cause the driver circuit 522 to apply a voltage to the gate of the power MOSFET 512, causing it to "close" and electrically connect the power source 506 and the inductor 514. The low voltage level may cause the driver circuit 522 to remove voltage from the gate of the power MOSFET 512, causing it to "open" and electrically disconnect the power source 506 and the inductor 514. The ratio of the time period for the high voltage level to the combined time periods for the high and low voltage levels may comprise a "duty cycle" of the MOSFET 512.

In operation, when the MOSFET 512 is closed, the inductor 514 will be coupled to the power source 506, causing an increasing current to flow through the inductor 514 and the load 508. This increasing current causes a voltage with a polarity opposite the power source 506 to generate across the inductor 514, and for energy from the current to be stored in a magnetic field within the inductor 514. At the same time, the voltage applied to the freewheeling diode 516 by the power source 506 acts to reverse bias and prevent any current flow through the diode 516. The opposite voltage across the inductor 514 acts as a voltage drop that reduces the voltage across the load 508.

While the current is still increasing, the MOSFET 512 may be opened, thereby disconnecting the power source 506 from the inductor 514. This may be referred to as the "off" period. With the power source 506 disconnected, the magnetic field stored in the inductor 514 will generate a voltage across the inductor 514 opposite that caused by current flow via connection with the power source 506. This voltage may forward bias the diode 516, allowing current to flow through the load 508 and diode 516, and a voltage to be applied to the load 508. To being the process anew and ensure that a voltage is available at the load 508, the MOSFET 512 may be subsequently closed either while the magnetic field stored in the inductor 514 is dissipating due to current flow, or after the magnetic field stored in the inductor 514 has completely dissipated. Closing the MOSFET 512 while the magnetic field stored in the inductor 514 is still dissipating leads to a continuous waveform and is referred to as a "continuous mode" of operations. Closing the MOSFET 512 after the magnetic field stored in the inductor 514 has dissipated leads to a discontinuous waveform and is referred to as a "discontinuous mode" of operations.

As MOSFET 512 closes and the current flows into the inductor 514, the voltage at the source node 512a of the MOSFET 512 starts to increase until reaching the power source 506 voltage. For driver circuit 522 to "close" or "open" MOSFET 512, a floating voltage source higher than the MOSFET 512 source node voltage is required to provide a sufficient gate-to-source drive voltage to the MOSFET 512, characterized by the voltage differential between a voltage at the gate node 512b of the MOSFET 512 and the voltage at the source node 512a. This floating voltage source may be provided, for example, by a charge-pump diode 526, a bootstrap capacitor 528, and bias voltage source 530.

In operation, the bootstrap capacitor 528 may be charged through the charge-pump diode 526 every switching cycle to provide a floating voltage. Since the voltage difference between the bias voltage 530 and the voltage at the source node 512a of the MOSFET 512 determines the charge voltage across the bootstrap capacitor 528, if the MOSFET 512 source node does not clamp to ground through the freewheeling diode 516 during the "off" period after the MOSFET 512 is open, the bootstrap capacitor 528 will not fully charge to provide adequate drive voltage for MOSFET 512 or supply voltage to the driver circuit 522, which leads to intermittent operation or potential driver circuit 522 latch-up. Additionally, for the current flow to occur during the off period, the voltage across the inductor 514 needs to be high enough when MOSFET 512 is closed. This can be problematic due to ramp up/ramp down times and other fluctuations in the power source 506, when the voltage differential between the power source 506 and the output capacitor 520 provides insufficient energy to the inductor 514 when the MOSFET 512 is closed to allow the inductor 514 to generate a voltage to forward bias the diode 516 when the switch 512 is opened. Specifically, for the continuous mode of operation, the freewheeling diode 516 may be forward biased during the entire off period and the bootstrap capacitor 528 may have the maximum charge voltage difference for the entire off period, whereas for the discontinuous mode of operation, bootstrap capacitor 528 may have the maximum charge voltage difference for only part of the off period. If the load 508 reduces sufficiently, the on-time for MOSFET 512 will be shorter because the buck converter 502 delivers less power and enter the discontinuous mode of operation. This reduces the magnetization of the inductor and reduce the freewheeling time of the diode 516 after the MOSFET 512 opens, preventing the bootstrap capacitor 528 from being fully recharged.

To overcome these issues, existing power converters often employ a low side switch in place of the freewheeling diode 516 to force the MOSFET 512 source node to ground during each off period. Other methods use an additional auxiliary bootstrap power supply to charge the bootstrap capacitor at the conditions of the ramp up/ramp down or other fluctuations in the power source 506. The solutions are not ideal, however, because they increase the complexity and expense of the power converter circuitry.

According to aspects of the present disclosure, the controller 504 may be used to maintain proper functionality of the converter 502, including reducing the potential for a latch-up condition at the MOSFET 512, rather than the additional circuitry and hardware discussed above. In the embodiment shown, the controller 504 may receive as inputs the voltage level provided by power source 506 and a feedback signal corresponding to the set point 550 of the converter 502, with the set point 550 corresponding to the voltage level output by the converter 502 to the load 508. The controller 504 may then alter the set point 550 based, at least in part, on the voltage level provided by power source 506 to reduce the potential for a latch-up condition at the drive circuit 522. In certain embodiments, this may include reducing the set point 550 below the voltage level provided by the power source 506 to facilitate current flow/magnetic field storage at the inductor 504 while the MOSFET 512 is closed so that the inductor 504 can generate sufficient voltage to forward bias the diode 516 when the switch 502 is open. In certain embodiments, the controller 504 may alter the set point 550 of the circuitry based, at least in part, on a control algorithm implemented as software within the controller 504. As used herein, software may comprise a set of instructions stored in a memory device coupled to a processor that when executed by processor, cause the processor to perform certain steps of actions.

Figure 6:
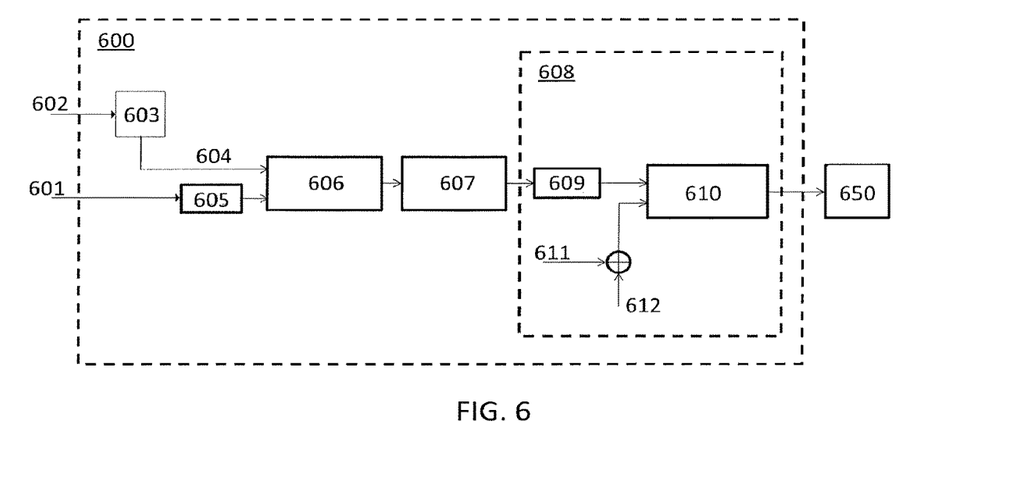
FIG. 6 is a diagram of an example controller, according to aspects of the present disclosure.

FIG. 6 is a functional diagram of an example controller 600 for use in an example power converter, such as the one depicted in FIG. 5, according to aspects of the present disclosure. The controller 600 receives a voltage feedback signal 601 corresponding to the current set point of an associated power converter, and a voltage signal 602 corresponding to the voltage output of a power source coupled to the power converter. The voltage signal 602 may be received at a calculation block 603 that determines a target set point 604 of the power converter using, for example, one or more algorithms that will be described below. The voltage feedback signal 601, in contrast, may be received and digitized at an analog to digital converter 605. Both the desired set point 604 and the digitized voltage feedback signal 601 may then be received and compared at an error calculation module 606. A digital controller 607 may receive the output from the error calculation module 606 and using a bank of stored error outputs, compute a control signal that is output to a current mode controller 608, which may determine a duty cycle based, at least in part, on the control signal that is then to output to a PWM circuit 650. Specifically, the control signal from the digital controller 607 may be converted to an analog signal at a DAC 609 and compared at a comparator 610 with a sensed inductor current 611. In certain embodiments, a slope compensation 612 may be added to stabilize the current loop. The output of the comparator 610 may comprise an altered duty cycle output to the PWM circuit 650 that alters the output of the corresponding power converter circuitry to match the target set point 604. Current mode controller 608 may not be needed if sole voltage mode control is used.

Figure 7:
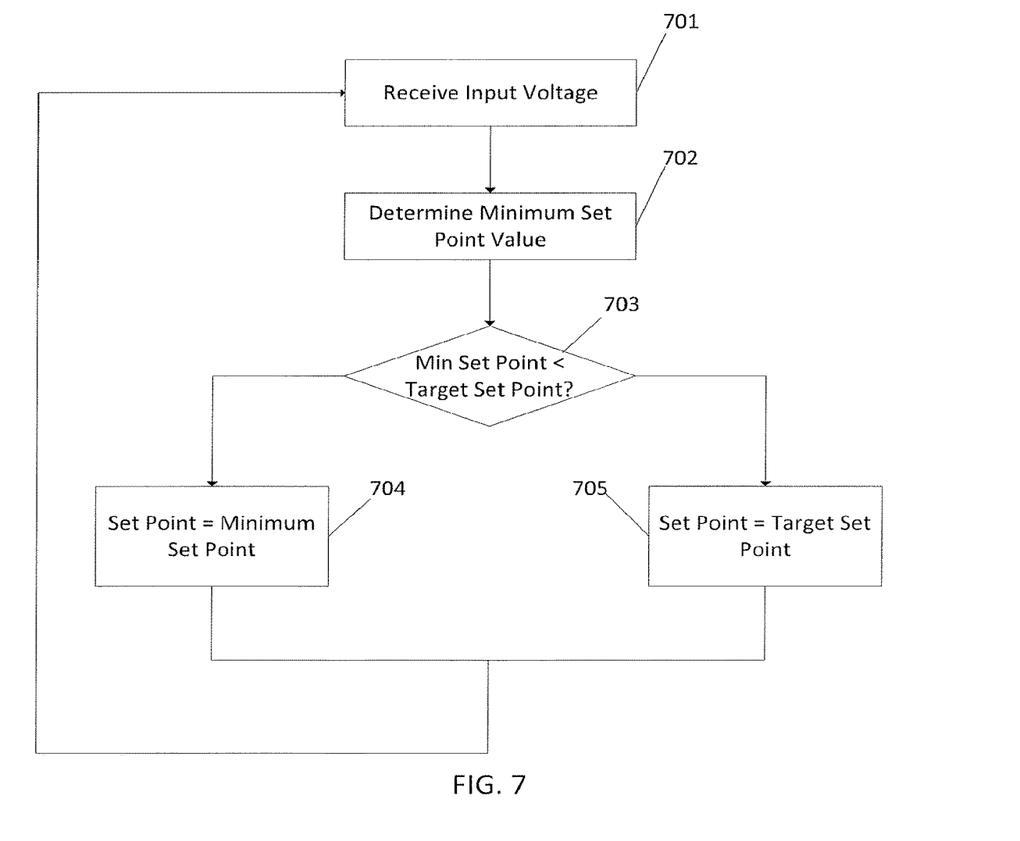
FIG. 7 is a flow diagram illustrating an example control algorithm, according to aspects of the present disclosure.

FIG. 7 is a flow diagram illustrating an example control algorithm for a power converter that include non-synchronous buck converter circuitry (e.g., circuitry 502), according to aspects of the present disclosure. At step 701 a controller, such as controllers 504 and 600, of the power converter may receive a signal identifying the voltage level provided by a power source ("Input Voltage"). At step 702, the controller may determine based, at least in part, on the received input voltage a minimum set point value required for an inductor of the buck converter circuitry to forward bias a diode of the buck converter circuitry when a switch of the buck converter circuitry is in an open position. In certain embodiments, the minimum set point value may be determined using the following equation:

$$\text{Set Point}_{Min} = \text{Input Voltage} - \text{sqrt}(2*E*L)/D$$

where E comprises the minimum energy needed to forward bias the diode; L comprises the inductance of the inductor; and D comprises the duty cycle of the switch. In certain embodiments, the values for E, L, and D may be stored within memory of the controller and accessed by a processor of the controller as part of step 702. The minimum set point value determination is not limited to the above equation; as other calculations, approximations or empirical inferences using, for example, input voltage, inductor value and duty cycle information may also be used.

Step 703 may comprise comparing the determined minimum set point value to a target set point of the power converter. In certain embodiments, the target set point of the power converter may be the ideal operating voltage for the electronic component coupled to the power converter. In certain embodiments, the target set point may be stored within memory of the controller like the values for E, L, and D. If the determined minimum set point value is less that the target set point value, then the controller may alter the set point of the buck converter circuitry to be the determined minimum set point value at step 704. If the determined minimum set point value is greater than the target set point value, then the controller may set or maintain the set point of the buck converter circuitry at the target set point at step 705. The algorithm may then proceed back to step 701, continuously monitoring and altering the set point of the power converter circuitry to ensure the buck converter circuitry avoids a latch-up condition. Reducing the set point value when the power source fluctuates or output load decreases may be advantageous, for example, during special downhole conditions when the buck converter does not need to deliver the full power.

According to aspects of the present disclosure, an example power converter system may comprise a non-synchronous buck converter and a controller coupled to the a non-synchronous buck converter to receive a voltage level provided by a power source to the non-synchronous buck converter. The controller may also determine a minimum set point value for the non-synchronous buck converter based, at least in part, on the received voltage level. The controller may also alter a set point of the non-synchronous buck converter if the determined minimum set point value is less than a target set point value of the non-synchronous buck converter. In certain embodiments, the non-synchronous buck converter comprises at least a switch, an inductor, and a free-wheeling diode, wherein the switch selectively electrically couples the power source to the inductor and the free-wheeling diode.

In one or more embodiments described in the preceding paragraph, the controller may be indirectly coupled to the switch and the set of instructions further cause the controller to generate control signals to open and close the switch.

In one or more embodiments described in the preceding two paragraphs, the controller may determine a minimum set point value for the non-synchronous buck converter based, at least in part, on the received voltage level further cause the processor to determine the minimum set point value for the non-synchronous buck converter using the following equation $$\text{Set Point}_{Min} = \text{Input Voltage} - \text{sqrt}(2*E*L)/D$$

where Set Point$_{Min}$ comprises the minimum set point value; E comprises a minimum energy needed to forward bias the diode; L comprises the inductance of the inductor; and D comprises the duty cycle of the switch.

In one or more embodiments described in the preceding paragraph, the controller retrieves values for E, L, and D stored within the controller.

In one or more embodiments described in the preceding four paragraphs, when the controller alters the set point of the non-synchronous buck converter if the determined minimum set point value is less than the target set point value of the non-synchronous buck converter, the controller compares the determined minimum set point value to the target set point value; alters the set point of the non-synchronous buck converter to be the minimum set point value if the minimum set point value is less than the target set point value; and alters the set point of the non-synchronous buck converter to be the target set point value if the minimum set point value is greater than the target set point value.

In one or more embodiments described in the preceding paragraph, the controller alters the output of the non-synchronous buck converter to maintain sufficient input/output voltage difference.

According to aspects of the present disclosure, an example method may comprise receiving a voltage level provided by a power source to a non-synchronous buck converter; determining a minimum set point value for the non-synchronous buck converter based, at least in part, on the received voltage level; and altering a set point of the non-synchronous buck converter if the determined minimum set point value is less than a target set point value of the non-synchronous buck converter.

In one or more embodiments described in the preceding paragraph, the non-synchronous buck converter may comprise at least a switch, an inductor, and a free-wheeling diode, wherein the switch selectively electrically couples the power source to the inductor and the free-wheeling diode.

In one or more embodiments described in the preceding paragraph, determining a minimum set point value for the non-synchronous buck converter based, at least in part, on the received voltage level comprises determining the minimum set point value for the non-synchronous buck converter using the following equation $$\text{Set Point}_{Min} = \text{Input Voltage} - \text{sqrt}(2*E*L)/D$$

where Set Point$_{Min}$ comprises the minimum set point value; E comprises a minimum energy needed to forward bias the diode; L comprises the inductance of the inductor; and D comprises the duty cycle of the switch.

In one or more embodiments described in the preceding three paragraphs, wherein altering the set point of the non-synchronous buck converter if the determined minimum set point value is less than the target set point value of the non-synchronous buck converter comprises comparing the determined minimum set point value to the target set point value; altering the set point of the non-synchronous buck converter to be the minimum set point value if the minimum set point value is less than the target set point value; and altering the set point of the non-synchronous buck converter to be the target set point value if the minimum set point value is greater than the target set point value.

In one or more embodiments described in the preceding paragraph, altering the set point of the non-synchronous buck converter comprises altering the output of the non-synchronous buck converter by changing the set point of the non-synchronous buck converter.

According to aspects of the present disclosure, an example system may comprise a downhole power source and an electrical component within a borehole in a subterranean drilling assembly. A power converter of the system may provide power to the electrical component from the downhole power source, the power converter comprising a non-synchronous buck converter and a controller coupled to the a non-synchronous buck converter. The controller may receive a voltage level provided by a power source to the non-synchronous buck converter; determine a minimum set point value for the non-synchronous buck converter based, at least in part, on the received voltage level; and alters a set point of the non-synchronous buck converter if the determined minimum set point value is less than a target set point value of the non-synchronous buck converter.

In one or more embodiments described in the preceding paragraph, the non-synchronous buck converter comprises at least a switch, an inductor, and a free-wheeling diode, wherein the switch selectively electrically couples the power source to the inductor and the free-wheeling diode.

In one or more embodiments described in the preceding paragraph, the controller is indirectly coupled to the switch and generates control signals to open and close the switch.

In one or more embodiments described in the preceding paragraph, the controller determines the minimum set point value for the non-synchronous buck converter based, at least in part, on the received voltage level using the following equation $$\text{Set Point}_{Min} = \text{Input Voltage} - \sqrt{(2 * E * L)}/D$$

where Set Point$_{Min}$ comprises the minimum set point value; E comprises a minimum energy needed to forward bias the diode; L comprises the inductance of the inductor; and D comprises the duty cycle of the switch.

In one or more embodiments described in the preceding four paragraphs, when the controller alters the set point of the non-synchronous buck converter if the determined minimum set point value is less than the target set point value of the non-synchronous buck converter, the controller compares the determined minimum set point value to the target set point value; alters the set point of the non-synchronous buck converter to be the minimum set point value if the minimum set point value is less than the target set point value; and alters the set point of the non-synchronous buck converter to be the target set point value if the minimum set point value is greater than the target set point value.

In one or more embodiments described in the preceding paragraph, the controller alters the output of the non-synchronous buck converter to maintain a sufficient input/output voltage difference.

In one or more embodiments described in the preceding six paragraphs, the downhole power source may comprises at least one of a battery pack, a bank of capacitors, and a fluid drive turbine coupled to an electrical generator.

In one or more embodiments described in the preceding paragraph, the electrical component comprises at least one of a sensor, controller, motor, and solenoid, and the target set point comprises an operating voltage of the electrical component.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A power converter system, comprising:
a non-synchronous buck converter; and
a controller coupled to the non-synchronous buck converter, wherein the controller
receives a voltage level provided by a power source to the non-synchronous buck converter;
determines a minimum set point value for the non-synchronous buck converter based, at least in part, on the received voltage level; and
alters a set point of the non-synchronous buck converter if the determined minimum set point value is less than a target set point value of the non-synchronous buck converter, wherein when the controller alters the set point of the non-synchronous buck converter if the determined minimum set point value is less than the target set point value of the non-synchronous buck converter, the controller
compares the determined minimum set point value to the target set point value;
alters the set point of the non-synchronous buck converter to be the minimum set point value if the minimum set point value is less than the target set point value; and
alters the set point of the non-synchronous buck converter to be the target set point value if the minimum set point value is greater than the target set point value.

2. The power converter system of claim 1, wherein the non-synchronous buck converter comprises at least a switch, an inductor, and a free-wheeling diode, wherein the switch selectively electrically couples the power source to the inductor and the free-wheeling diode.

3. The power converter system of claim 2, wherein the controller is indirectly coupled to the switch and generates control signals to open and close the switch.

4. The power converter system of claim 2, wherein the controller determines the minimum set point value for the non-synchronous buck converter using the following equation Set Point$_{Min}$=Input Voltage−sqrt(2*E*L)/D where Set Point$_{Min}$ comprises the minimum set point value; E comprises a minimum energy needed to forward bias the diode; L comprises the inductance of the inductor; and D comprises the duty cycle of the switch.

5. The power converter system of claim 4, wherein the controller retrieves values for E, L, and D stored within the controller.

6. The power converter system of claim 1, wherein the controller alters the output of the non-synchronous buck converter to maintain sufficient input/output voltage difference.

7. A method, comprising:
receiving a voltage level provided by a power source to a non-synchronous buck converter;
determining a minimum set point value for the non-synchronous buck converter based, at least in part, on the received voltage level; and
altering a set point of the non-synchronous buck converter if the determined minimum set point value is less than a target set point value of the non-synchronous buck converter, wherein altering the set point of the non-synchronous buck converter if the determined minimum set point value is less than the target set point value of the non-synchronous buck converter comprises
comparing the determined minimum set point value to the target set point value;
altering the set point of the non-synchronous buck converter to be the minimum set point value if the minimum set point value is less than the target set point value; and
altering the set point of the non-synchronous buck converter to be the target set point value if the minimum set point value is greater than the target set point value.

8. The method of claim 7, wherein the non-synchronous buck converter comprises at least a switch, an inductor, and a free-wheeling diode, wherein the switch selectively electrically couples the power source to the inductor and the free-wheeling diode.

9. The method of claim 8, wherein determining a minimum set point value for the non-synchronous buck converter based, at least in part, on the received voltage level comprises determining the minimum set point value for the non-synchronous buck converter using the following equation Set Point$_{Min}$=Input Voltage−sqrt(2*E*L)/D where Set Point$_{Min}$ comprises the minimum set point value; E comprises a minimum energy needed to forward bias the diode; L comprises the inductance of the inductor; and D comprises the duty cycle of the switch.

10. The method of claim 7, wherein altering the set point of the non-synchronous buck converter comprises altering the output of the non-synchronous buck converter by changing the set point of the non-synchronous buck converter.

11. A system, comprising:
a downhole power source;
an electrical component within a borehole in a subterranean drilling assembly; and
a power converter providing power to the electrical component from the downhole power source, the power converter comprising
a non-synchronous buck converter; and
a controller coupled to the a non-synchronous buck converter, wherein the controller
receives a voltage level provided by a power source to the non-synchronous buck converter;
determines a minimum set point value for the non-synchronous buck converter based, at least in part, on the received voltage level; and
alters a set point of the non-synchronous buck converter if the determined minimum set point value is less than a target set point value of the non-synchronous buck converter, wherein when the controller alters the set point of the non-synchronous buck converter if the determined minimum set point value is less than the target set point value of the non-synchronous buck converter, the controller
compares the determined minimum set point value to the target set point value;
alters the set point of the non-synchronous buck converter to be the minimum set point value if the minimum set point value is less than the target set point value; and
alters the set point of the non-synchronous buck converter to be the target set point value if the minimum set point value is greater than the target set point value.

12. The system of claim 11, wherein the non-synchronous buck converter comprises at least a switch, an inductor, and a free-wheeling diode, wherein the switch selectively electrically couples the power source to the inductor and the free-wheeling diode.

13. The system of claim 12, wherein the controller is indirectly coupled to the switch and generates control signals to open and close the switch.

14. The system of claim 13, wherein the controller determines the minimum set point value for the non-synchronous buck converter based, at least in part, on the received voltage level using the following equation Set Point$_{Min}$=Input Voltage−sqrt(2*E*L)/D where Set Point$_{Min}$ comprises the minimum set point value; E comprises a minimum energy needed to forward bias the diode; L comprises the inductance of the inductor; and D comprises the duty cycle of the switch.

15. The power converter system of claim 11, wherein the controller alters the output of the non-synchronous buck converter to maintain a sufficient input/output voltage difference.

16. The system of claim 11, wherein the downhole power source comprises at least one of a battery pack, a bank of capacitors, and a fluid drive turbine and wherein the at least one of the battery pack, the bank of capacitors, and the fluid drive turbine is coupled to an electrical generator.

17. The system of claim 16, wherein the electrical component comprises at least one of a sensor, controller, motor, and solenoid, and the target set point comprises an operating voltage of the electrical component.

* * * * *